United States Patent
Abe

(10) Patent No.: US 7,551,208 B2
(45) Date of Patent: Jun. 23, 2009

(54) DEVICE FOR ADJUSTING WHITE BALANCE BASED ON A SELECTED PART FIELD OF A DISPLAYED IMAGE

(75) Inventor: Tetsuya Abe, Tokyo (JP)

(73) Assignee: Hoya Corporation, Tokyo (JP)

( * ) Notice: Subject to any disclaimer, the term of this patent is extended or adjusted under 35 U.S.C. 154(b) by 707 days.

(21) Appl. No.: 11/246,070

(22) Filed: Oct. 11, 2005

(65) Prior Publication Data

US 2006/0087566 A1  Apr. 27, 2006

(30) Foreign Application Priority Data

Oct. 12, 2004  (JP) ............................ P2004-297906

(51) Int. Cl.
*H04N 9/73* (2006.01)
(52) U.S. Cl. .............................. 348/223.1; 348/333.02; 348/222.1
(58) Field of Classification Search ... 348/223.1–228.1, 348/333.01–333.03, 222.1
See application file for complete search history.

(56) References Cited

U.S. PATENT DOCUMENTS

| 6,510,285 | B2 | 1/2003 | Hirai et al. |
| 6,598,986 | B2 | 7/2003 | Yano |
| 6,958,773 | B1 | 10/2005 | Sato |
| 7,253,836 | B1 * | 8/2007 | Suzuki et al. ............... 348/234 |
| 7,397,502 | B2 * | 7/2008 | Shiraishi .................. 348/223.1 |
| 2002/0085100 | A1 * | 7/2002 | Takahashi .................... 348/223 |
| 2002/0101516 | A1 * | 8/2002 | Ikeda ......................... 348/223 |
| 2004/0109083 | A1 | 6/2004 | Fuchimukai |
| 2005/0286097 | A1 * | 12/2005 | Hung et al. ................. 358/509 |
| 2006/0081760 | A1 * | 4/2006 | Kikuchi ................... 250/201.5 |

FOREIGN PATENT DOCUMENTS

| JP | 11-285011 | 10/1999 |
| JP | 11-355784 | 12/1999 |

OTHER PUBLICATIONS

English Language Abstract of JP 11-355784.
English Language Abstract of JP 11-285011.

* cited by examiner

*Primary Examiner*—Lin Ye
*Assistant Examiner*—Gevell Selby
(74) *Attorney, Agent, or Firm*—Greenblum & Bernstein, P.L.C.

(57) ABSTRACT

A digital camera is for photographing an object so as to obtain an object image. The digital camera has a display processor, a distinction processor, and an obtaining processor. The display processor displays object image as a display image on a monitor. In this case, the display image is divided into a plurality of part fields. One of part fields is selected as a selected part field. The distinction processor distinguishes the selected part field from other part fields in the display image. The obtaining processor obtains white balance information for carrying out a white balance adjustment, based on color data of pixels in the selected field.

20 Claims, 9 Drawing Sheets

FIG. 7

ORDER OF PRIORITY

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 211 | 212 | 213 | 214 | 215 | 216 | 217 | 218 | 219 | 220 | 221 | 222 | 223 | 224 | 225 | 226 |
| 2 | 210 | 157 | 158 | 159 | 160 | 161 | 162 | 163 | 164 | 165 | 166 | 167 | 168 | 169 | 170 | 227 |
| 3 | 209 | 156 | 111 | 112 | 113 | 114 | 115 | 116 | 117 | 118 | 119 | 120 | 121 | 122 | 171 | 228 |
| 4 | 208 | 155 | 110 | 73 | 74 | 75 | 76 | 77 | 78 | 79 | 80 | 81 | 82 | 123 | 172 | 229 |
| 5 | 207 | 154 | 109 | 72 | 43 | 44 | 45 | 46 | 47 | 48 | 49 | 50 | 83 | 124 | 173 | 230 |
| 6 | 206 | 153 | 108 | 71 | 42 | 21 | 22 | 23 | 24 | 25 | 26 | 51 | 84 | 125 | 174 | 231 |
| 7 | 205 | 152 | 107 | 70 | 41 | 20 | 7 | 8 | 9 | 10 | 27 | 52 | 85 | 126 | 175 | 232 |
| 8 | 204 | 151 | 106 | 69 | 40 | 19 | 6 | 1 | 2 | 11 | 28 | 53 | 86 | 127 | 176 | 233 |
| 9 | 203 | 150 | 105 | 68 | 39 | 18 | 5 | 4 | 3 | 12 | 29 | 54 | 87 | 128 | 177 | 234 |
| 10 | 202 | 149 | 104 | 67 | 38 | 17 | 16 | 15 | 14 | 13 | 30 | 55 | 88 | 129 | 178 | 235 |
| 11 | 201 | 148 | 103 | 66 | 37 | 36 | 35 | 34 | 33 | 32 | 31 | 56 | 89 | 130 | 179 | 236 |
| 12 | 200 | 147 | 102 | 65 | 64 | 63 | 62 | 61 | 60 | 59 | 58 | 57 | 90 | 131 | 180 | 237 |
| 13 | 199 | 146 | 101 | 100 | 99 | 98 | 97 | 96 | 95 | 94 | 93 | 92 | 91 | 132 | 181 | 238 |
| 14 | 198 | 145 | 144 | 143 | 142 | 141 | 140 | 139 | 138 | 137 | 136 | 135 | 134 | 133 | 182 | 239 |
| 15 | 197 | 196 | 195 | 194 | 193 | 192 | 191 | 190 | 189 | 188 | 187 | 186 | 185 | 184 | 183 | 240 |
| 16 | 256 | 255 | 254 | 253 | 252 | 251 | 250 | 249 | 248 | 247 | 246 | 245 | 244 | 243 | 242 | 241 |

DEVICE FOR ADJUSTING WHITE BALANCE BASED ON A SELECTED PART FIELD OF A DISPLAYED IMAGE

BACKGROUND OF THE INVENTION

1. Field of the Invention

The present invention relates to a white balance adjustment which is carried out in a digital camera for example 2. Description of the Related Art Digital cameras are used to photograph objects which are illuminated by various light sources having different color temperatures, for example: sunshine, fluorescent lamps, incandescent lamps, and so on. The color tone of the photographed object image is affected by the color temperature of the light source, therefore, the color tone of the photographed object image is sometimes different from that of the object.

For eliminating the difference in the color tone, conventionally a white balance of the photographed object image is adjusted. The white balance adjustment is usually carried out based on color balance information (white balance information), which is generated automatically or manually.

It is known that the color balance information can be generated manually based on color temperature information that is input by the user as shown in Japanese Unexamined Patent Publication (KOKAI) NO. H11-355784. However, with this method, the user has to grasp the color temperature of all the light sources in advance to input the color temperature information. Further, the object in sometimes illuminated by a combination of a plurality of light sources. In this case, it is difficult for a user to identify the color temperature of the combination, even if the user grasps the color temperature of all the light sources.

A method for manually generating color balance information is known whereby an object having achromatic color (for example the white or gray paper) is displayed as the display image in the whole display field, and then the color balance information is generated using all the color data of the object image. In this method, precise color balance information can be generated even if the object is illuminated by a plurality of light sources. However, it is difficult to photograph an object having achromatic color, using the whole display field.

SUMMARY OF THE INVENTION

Therefore, an object of the present invention is to provide a digital camera, which can adjust the white balance of an object image appropriately using precious white balance information obtained by a simple operation.

According to the present invention, a digital camera which comprises a display processor, a distinction processor, and an obtaining processor is provided for photographing an object so as to obtain an object image.

In this invention, the display processor displays object image as a display image on a monitor. The display image is divided into a plurality of part fields and one of the part fields is selected as a selected part field. The distinction processor distinguishes the selected part field from other fields in the display image. The obtaining processor obtains white balance information for carrying out a white balance adjustment, based on color data of pixels in the selected field.

Preferably, the display processor indicates the display image as being divided into the plurality of part fields. Preferably, the selected part field is changed according to an operation of a switch. The selected field is selected from the part fields which have a luminance value in a predetermined range, for example.

Optionally the part field which is composed of pixels having color data being closest to standard color data, is selected as the selected part field.

Optionally, when the plurality of part fields are ranked, the selected part field is changed according to ranking, by the operation of a switch. In this case, the part field, which is composed of pixels having color data being closer to standard color data, is ranked at a higher ranking for example.

The standard color data preferably has a 1:1:1 RGB ratio When the part fields which have a luminance value in the predetermined range are detected as detected part fields, an average of color data of pixels in the detected part fields is determined to be standard color data, for example. Namely, the standard color is determined to be standard color data in an auto white balance adjustment for example.

Optionally, the display image is divided into a number of part fields which is determined in advance. In this case, the number of part fields which is determined in advance is changeable according to the operation of a switch. When the display image is divided into a plurality of part fields, each part field preferably has the same area.

In this case, the color data means an average of color data of pixels in the selected field, for example.

Preferably, the part field which is composed of pixels having an RGB ratio of color data being closest to the standard color ratio, is selected as the selected field.

BRIEF DESCRIPTION OF THE DRAWINGS

The objects and advantages of the present invention will be better understood from the following description, with reference to the accompanying drawings in which:

FIG. 7 is a table of the order of priority for ranking;

DESCRIPTION OF THE PREFERRED EMBODIMENTS

Figure 1:
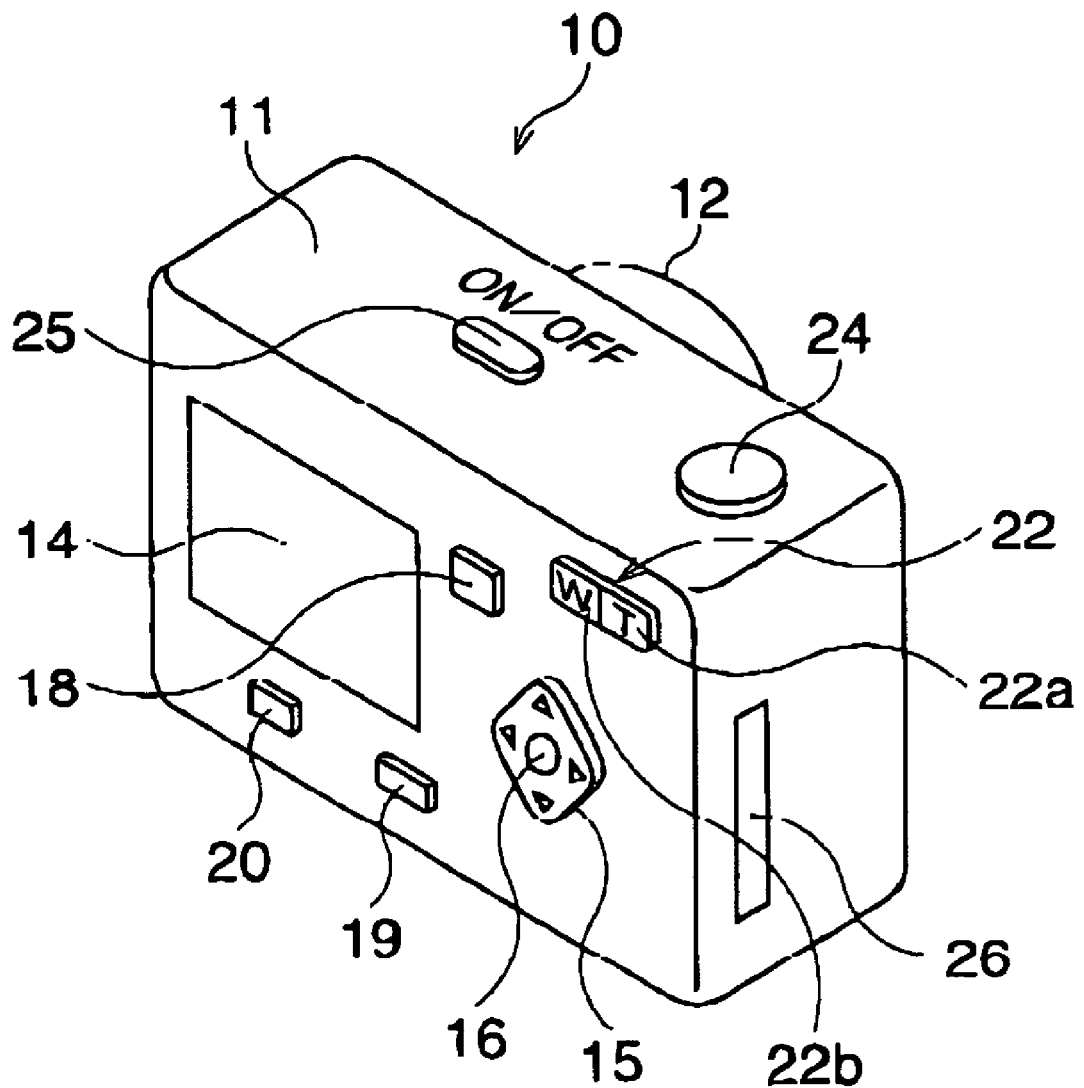
FIG. 1 is a perspective view of a digital camera in one embodiment of this invention.

The present invention will be described below with reference to the embodiments shown in the drawings.

FIG. 1 is a perspective view of a digital camera of a first embodiment of this invention, shown from behind. The digital camera 10, has a camera body 11 with a photographic optical system 12 in a center of a front surface thereof, and a LCD monitor 14 on a left side of a back surface thereof. The monitor 14 displays the moving and still images which are captured by the optical system 12.

The back surface of the camera body 11 is provided with a four-way controller switch 15 on the right side of the monitor 14, and an OK switch 16 at the center of the four-way controller switch 15. The back surface is further provided with a replay switch 18, a menu switch 19, and a white-balance (WB) switch 20 around the monitor 14 and a zoom switch 22 on the upper side of the four-way controller switch 15. The zoom switch 22 consists of a tele switch 22a on the right side thereof and a wide switch 22b on the left side thereof.

When the camera body 11 is viewed from the back surface, a release button 24 is provided on a right side of an upper surface of the camera body 11, and the power switch 25 is provided at a center position of the upper surface. When the release button 24 is fully-pushed, the object is photographed so as to obtain a still image. The still image is displayed on the monitor 14 and is recorded in a recording media (e.g. a PC card).

The side surface of the camera body 11 is provided with a card slot 26 for inserting a PC card. A card connector (not shown in FIG. 1) for connecting the PC card to the digital camera 10 is provided inside the card slot 26.

Figure 2:
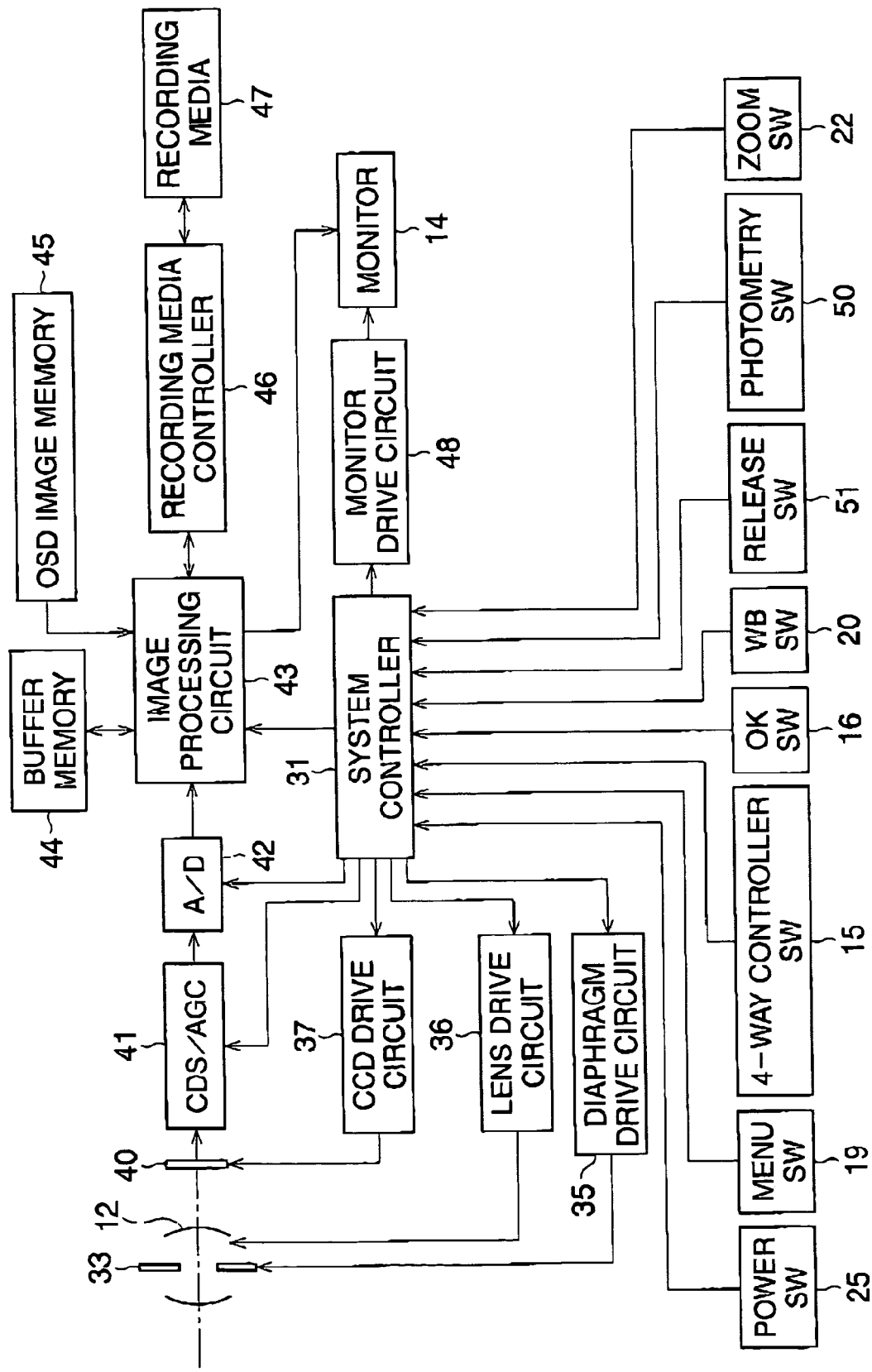
FIG. 2 is a block diagram of a digital camera in this embodiment.

FIG. 2 is a block diagram of a digital camera in this embodiment. The operation of the digital camera 10 is controlled by a system controller 31.

The switches (the power switch 25, the menu switch 19, the WB switch 20, and so on) are connected to the system controller 31. If the power switch 25 is pushed in a state where the power supply to the digital camera 10 is off, the power supply is switched on and the photograph mode is started. In the photograph mode, the mode of the digital camera 10 is changed to a condition set-up mode if the menu switch 19 is pushed. In the condition set-up mode, the photograph conditions are changed according to the operation of the switches. For example, in the condition set-up mode, the white balance (WB) mode is set-up and the white balance (WB) mode is determined to be in a manual white balance mode or an automatic white balance mode according to the operation of the OK switch 16 and the four-way controller switch 15.

The monitor 14 connects to the system controller 31 through a monitor drive circuit 48 which drives the monitor 14.

The photographic optical system 12 consists of the front lens group and back lens group, and a diaphragm 33 is provided between these lens groups. The diaphragm 33 is driven according to a control signal which is input from a diaphragm drive circuit 35, so that an aperture of the diaphragm 33 is adjusted. Each lens in the optical system 12 is moved by a lens drive circuit 36 so that the focus of the optical system 12 is adjusted. The diaphragm drive circuit 35 and the lens drive circuit 36 are controlled by the system controller 31.

In the camera body 11, a CCD (imaging device) 40 which is disposed behind to the optical system 12 and on the optical axis thereof, is provided. The CCD 40 is driven by a CCD drive circuit 37 which is controlled by the system controller 31.

Reflected light from an object is captured by the CCD 40 through the optical system 12 so that the object image is formed according to the reflected light on a light receiving surface of the CCD 40. The object image is input as image signals (digital signals) to an image processing circuit 43 through a correlated-double-sampling and auto-gain-control (CDS/AGC) circuit 41 and an A/D converter 42.

When the through image is displayed on the monitor 14, the image signals which are generated by the CCD 40 are continuously input to the image processing circuit 43. And the image signals undergo many kinds of image processes including white balance adjustment, and then the number of image pixels is reduced so that the image signals are converted to image data in the image processing circuit 43. The image data is sent to a buffer memory 44 and temporarily stored therein.

After that, image data which is read from the buffer memory 44 is displayed on the monitor 14 so that the through image is displayed on the monitor 14. These processes are carried out in the photograph mode, therefore the through image is displayed on the monitor 14 in the photograph mode.

In the photograph mode, if the release button 24 is half-pushed, the photometry switch 50 is activated. If the switch 50 is activated, the photometric values and the distance between the object and the digital camera 11 are measured, and the diaphragm 33 and the optical system 12 are adjusted based on the measured values. After that, when the release button 24 is fully-pushed, the release switch 51 is activated and the object is photographed. Namely, if the release button 24 is fully-pushed, the object image which is formed an the CCD 40 is converted to image signals. The image signals are input to the image processing circuit 43. At the image process circuit 43, the image signals undergo many kinds of image processes including a white balance adjustment, and then the number of image pixels thereof is not reduced, so that the image signals are converted to still image data. The still image data is sent to the recording media 47 through a recording media controller 46 and is then stored therein and displayed on the monitor 14 as the still image.

Figure 3:
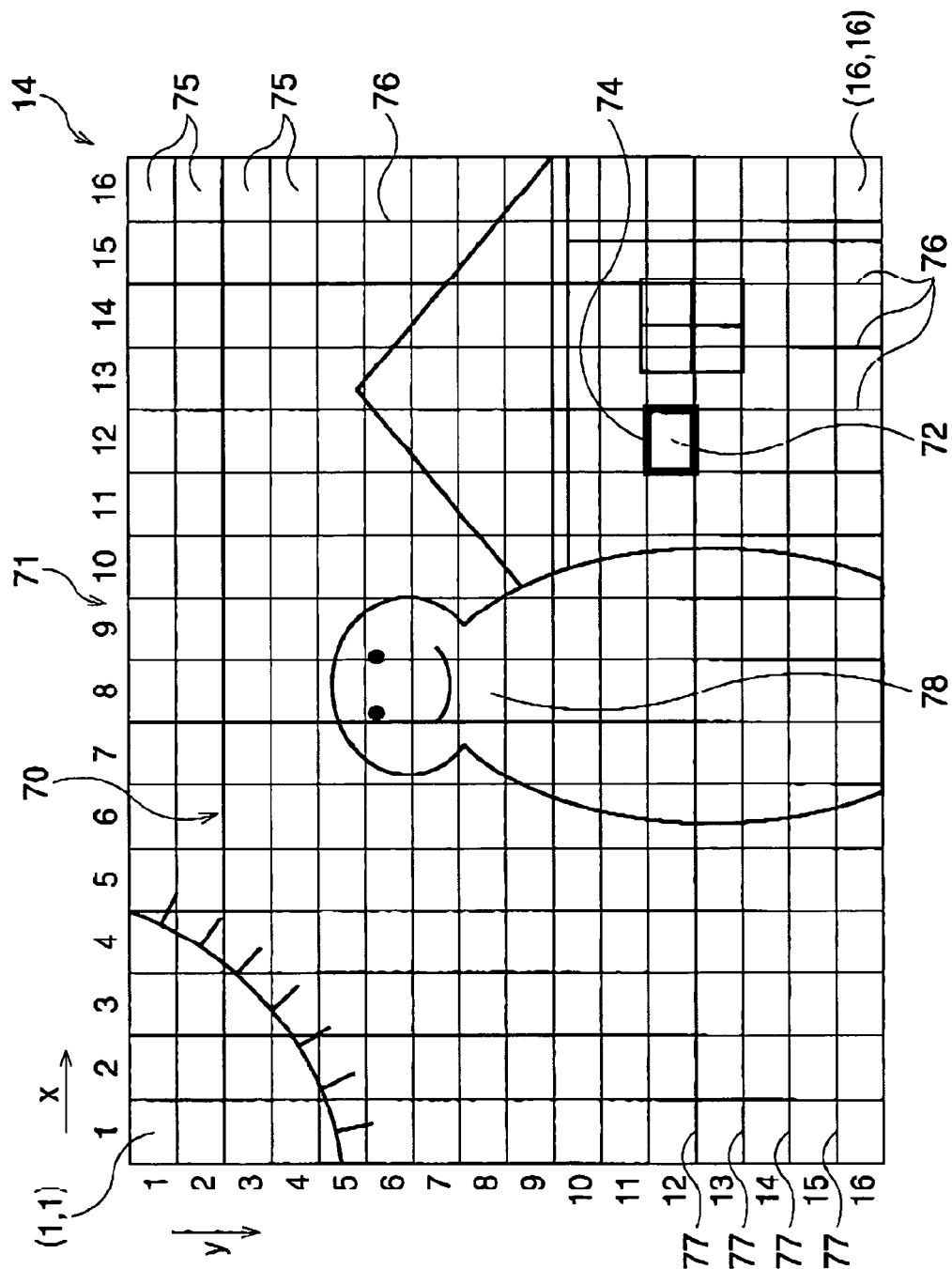
FIG. 3 is a view of a monitor when the white balance mode is set-up in the manual white balance mode.

An OSD image memory 45, which is connected to the image process circuit 43, stores a grid line image 70 and a selected frame image 74 (as shown in FIG. 3). The grid line image 70 and the selected frame image 74 are read from the memory 45 and are overlaid on the object image (the still image or the through image) when the white balance mode is set to the manual white balance mode, as described below.

FIG. 3 shows the monitor 14 when the white balance mode is set to the manual white balance mode. In the manual white balance mode, the object image (still image or the through image), on which the grid line image 70 and selected frame image 74 are overlaid, is displayed on the monitor 14 as the display image 71. The grid line image 70, which is composed of vertical lines 76 and horizontal lines 77, has a grid shape. The displayed image 71 is divided into a plurality of part fields 75 by the grid line. In this case, each part field 75 has the same area because the display image 71 is divided by the vertical lines 76 and the horizontal lines 77 which are arranged at even intervals. The display image 71 is divided into 256 part fields (16×16) for example. Furthermore, each part field 75 is indicated by coordinates (x,y). Namely, the part field 75 which is located in a top-left corner is indicated as (1, 1). "1" is added to "x", if the part field 75 moves right and "1" is added to "y" it the part field 75 moves down. Therefore, the part field 75 which is located in the bottom-right corner is indicated as (16, 16).

The selected frame image 74 surrounds one of the part fields 75, which is selected as a selected part field 72. The selected part field is changed according to an operation of the zoom switch 22 or the four-way controller switch 15 as described below, and the selected frame 74 moves according to the aligning of the selected part field.

The line of the selected frame image 74 is bolder than the line of the grid line image 70, so that the selected field 72 is distinguished from other fields in the display image 71. As described above, the selected field 72 is distinguished by the selected frame image 74 which is overlaid on display image 71 by the image processing circuit 43. Therefore, the image processing circuit 43 functions as a distinction processor, by distinguishing a particular frame image 74.

In the manual white balance mode, if the WB switch 20 is pushed, the selected part field is determined to be the WB (white balance) part field, and white balance information is generated by using color data of pixels in that WB part field. The process for the generating white balance information will be explained below in detail.

In this process, an average of color data for pixels which are in the WB part field, is calculated as average color data (Ra, Ga, Ba) at first. Next, the white information data which is composed of R gain data ($R_{gain}$), G gain data ($G_{gain}$), and B gain data ($B_{gain}$), is calculated from the average color data (Ra, Ga, Ba) of pixels in the WB part field. Namely, R gain data ($R_{gain}$), G gain data ($G_{gain}$), and B gain data ($B_{gain}$) are respectively set to Ga/Ra, 1, and Ga/Ba for example.

The white information data is used in the white balance adjustment which is carried out in the image processing circuit 43 in the photograph mode. Namely, RGB gains of the image signals are changed to Ga/Ra, 1, and Ga/Ba respectively so as to adjust the white balance of the image signals in the photograph mode.

Conventionally, the white balance L information is obtained using color data of pixels of the whole display field. Therefore, an object having achromatic color (pure white object, for example white paper) has to be photographed using the whole display field. On the other hand, the white balance information is obtainable using color data of pixels in the part fields having achromatic color in this embodiment. Therefore, an object having achromatic color does not have to be photographed using the whole display field. Namely, the object having achromatic color has only to be photographed in a part field 75 of the displayed field. Therefore, it is easy to obtain the white balance information without a complicated operation in this embodiment. Further, a part field for obtaining the white balance information can be selected by a user. Therefore the appropriate white balance information can be obtained based on the user's judgment.

Furthermore, when the manual white balance mode is started, the divided part fields are ranked and the first (highest) ranked part field is selected as a selected field 72 in the initial situation. The process of ranking divided part fields will be explained in detail.

In this process, firstly averages of color data of pixels which are in a part field 75, are calculated as average color data (Ra, Ga, Ba) for each the part field 75, regarding all the part fields 75, at the image process circuit 43. The average color data (Ra, Ga, Ba) for a part field 75 is converted to luminance data (Ya) and color difference data (Cba, Cra). Next, it is determined whether the luminance data (Ya) for a part field 75 is in a predetermined range, regarding all the part fields 75, and the part fields 75 having the luminance data (Ya) which is in a predetermined range are detected as the detected part fields.

The detected part field whose average color data (Ra, Ga, Ba) is closer to standard color data, is given a higher ranking. Namely, the detected part fields, having a ratio of Ra, Ga, and Ba which is closer to the standard RGB ratio, are ranked at a higher ranking. Therefore, the detected part field having the ratio of Ra, Ga, and Ba, which is the closest to the standard RGB ratio, is ranked to the first (highest) ranking. The detected part field, having the ratio of Ra, Ga, and Ea which is the second closest to the standard ratio of RGB, is ranked second (second highest ranking). Similarly, the other detected part fields are ranked according to the ratio of Ra, Ga, and Ba.

The standard RGB ratio is the ratio of averages of RGB color data in all the detected part fields. Therefore, in this embodiment, the ranking of the part fields is done using an index number (Cwa) which is calculated based on formula (1).

$$Cwa = \sqrt{(Cbt - Cba)^2 + (Crt - Cra)^2} \quad (1)$$
$$Cbt = \sum Cba/T, \; Crt = \sum Cra/T$$

Further, "Cba" and "Cra" in formula (1) are the color difference data in each detected pact field, and "T" is the number of detected part fields in the display image 71. Therefore, "Cbt" and "Crt" are the averages of "Cba" and "Cra" in all the detected part fields, respectively. Therefore, if the "Cbt" and "Crt" are calculated, the standard RGB ratio can be determined based on the "Cbt" and "Crt".

According to formula (1), if the RGB ratio of a detected part field is closer to the standard RGB ratio, the index number (Cwa) is smaller. Therefore, the detected field which has the smallest index number (Cwa) is determined to be the highest ranking part field. The highest ranking part field is selected as the selected part field in the initial situation because the detected part field which has the smallest index number is (Cwa), also has the closest Ra:Ga:Ba ratio to the standard RGB ratio.

In the auto white balance mode, when the image signal undergoes the white balance adjustment, an average of the color data in all the part fields 75 (or all detected fields) is set-up to the standard color data and the standard color data is adjusted to be the 1:1:1 RGB ratio, because the color data of a mixture of all images on the display field of the monitor 14 (or all detected fields) is adjusted to be a white image (the achromatic color image).

Similarly, in the manual white balance mode of this embodiment, the standard color data is determined to be the average of the color data in all the detected fields. Namely, the standard color data in the manual white balance mode of this embodiment is determined to be the standard color data in the auto white balance adjustment.

Therefore, there is a high possibility that the highest ranking part field is the most appropriate for obtaining the white balance information. Accordingly the highest ranking part field is determined to be the selected part field in the initial situation.

However, the highest ranking part field is not always appropriate for obtaining the white balance information. And, the user sometimes wants to obtain the white balance information based on colors other than the achromatic color in order to change the color tone of the object image to a different color tone. Therefore, the user can change the selected part field by operating the four-way controller switch and the zoom switch as described below.

Of course, in the initial situation, another field can be selected as the selected part field 72 in the initial situation. Fox example, the center part field 78 (8, 8) can be selected as the selected part field 72 in the initial situation. In this case, the center part field 78 is distinguished from other fields by the selected frame 74.

Figure 4:
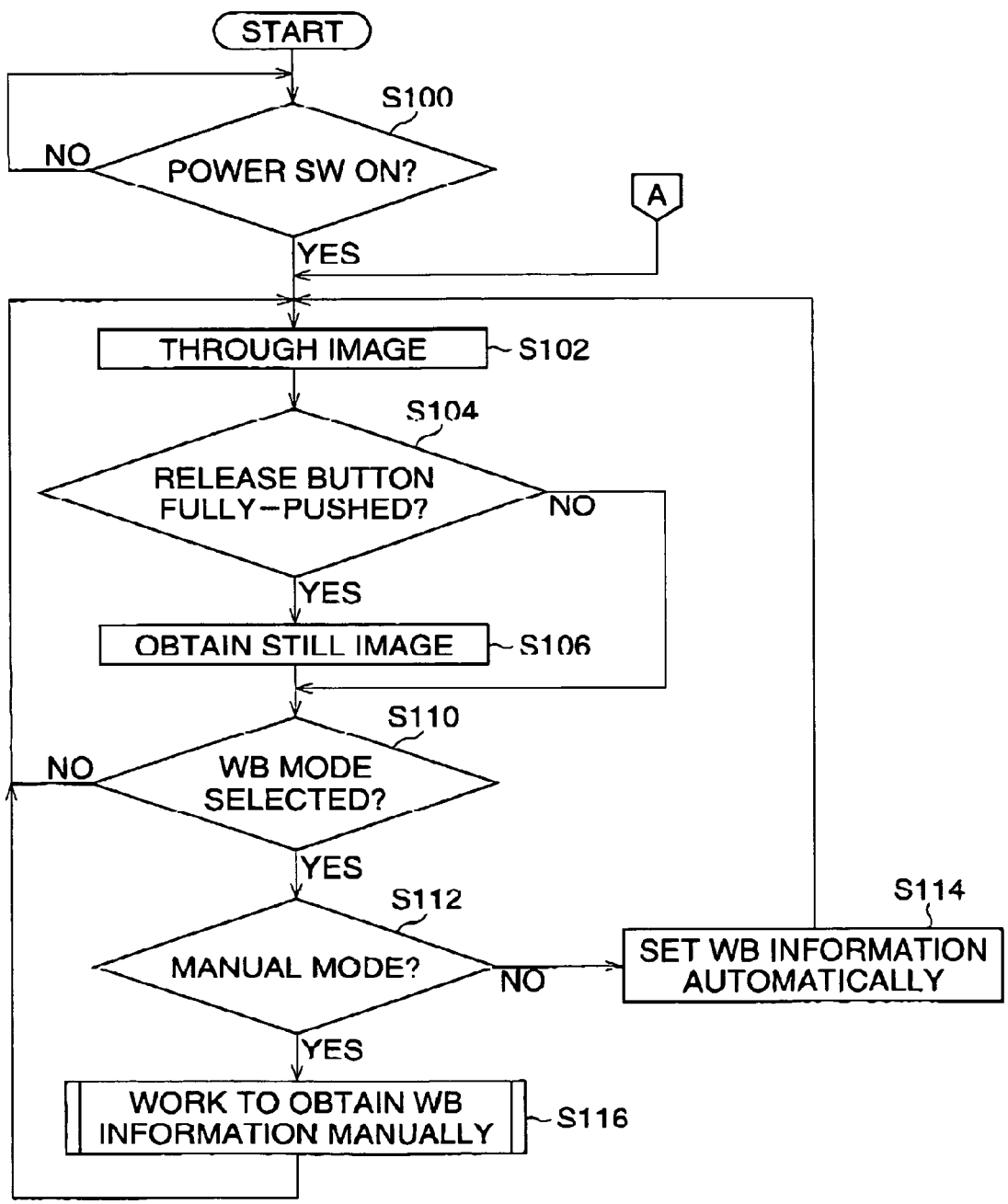
FIG. 4 is a flow chart showing a routine of a photograph mode.
Figure 5:
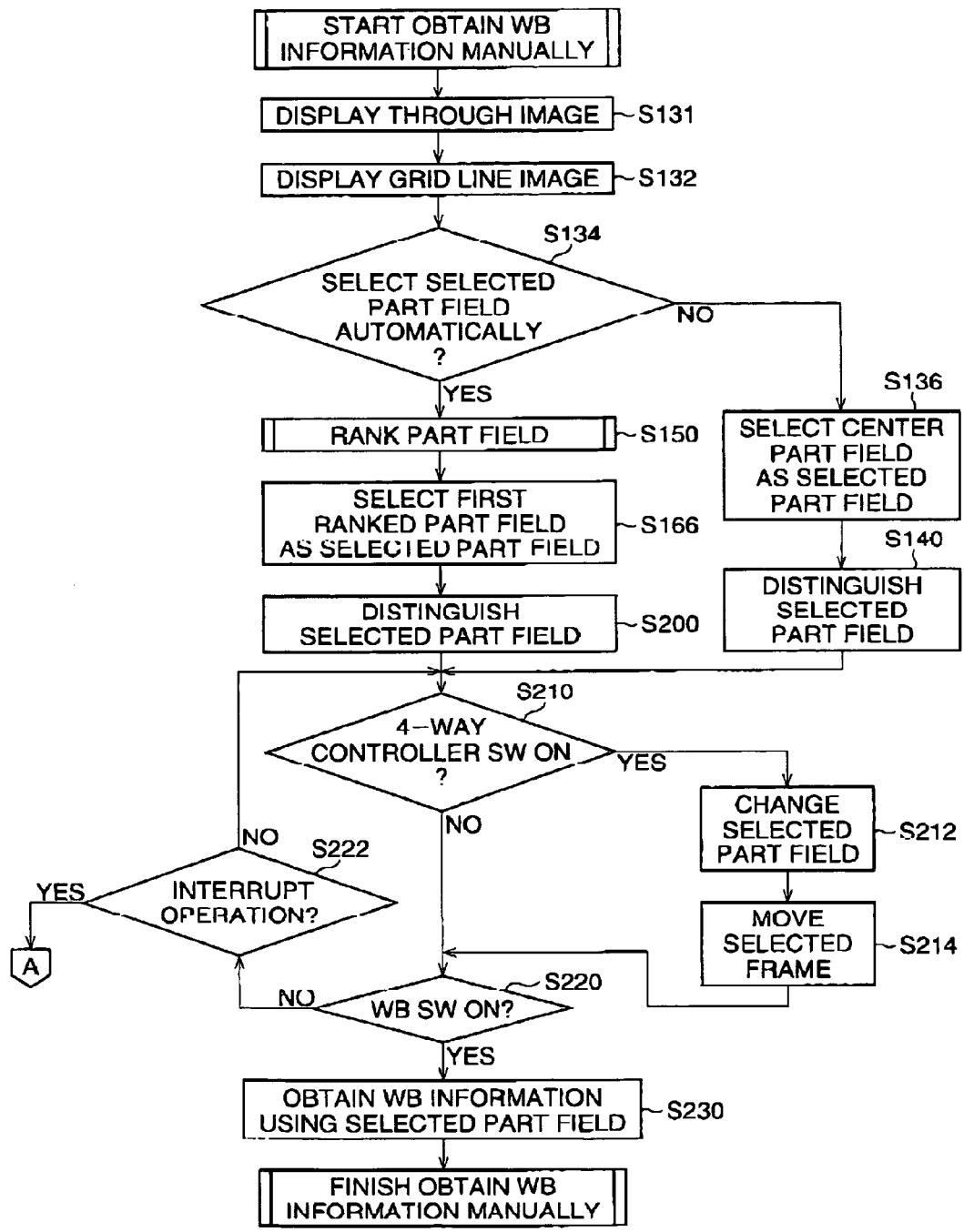
FIG. 5 is a flow chart showing a routine for manually obtaining white balance information using a through image.
Figure 6:
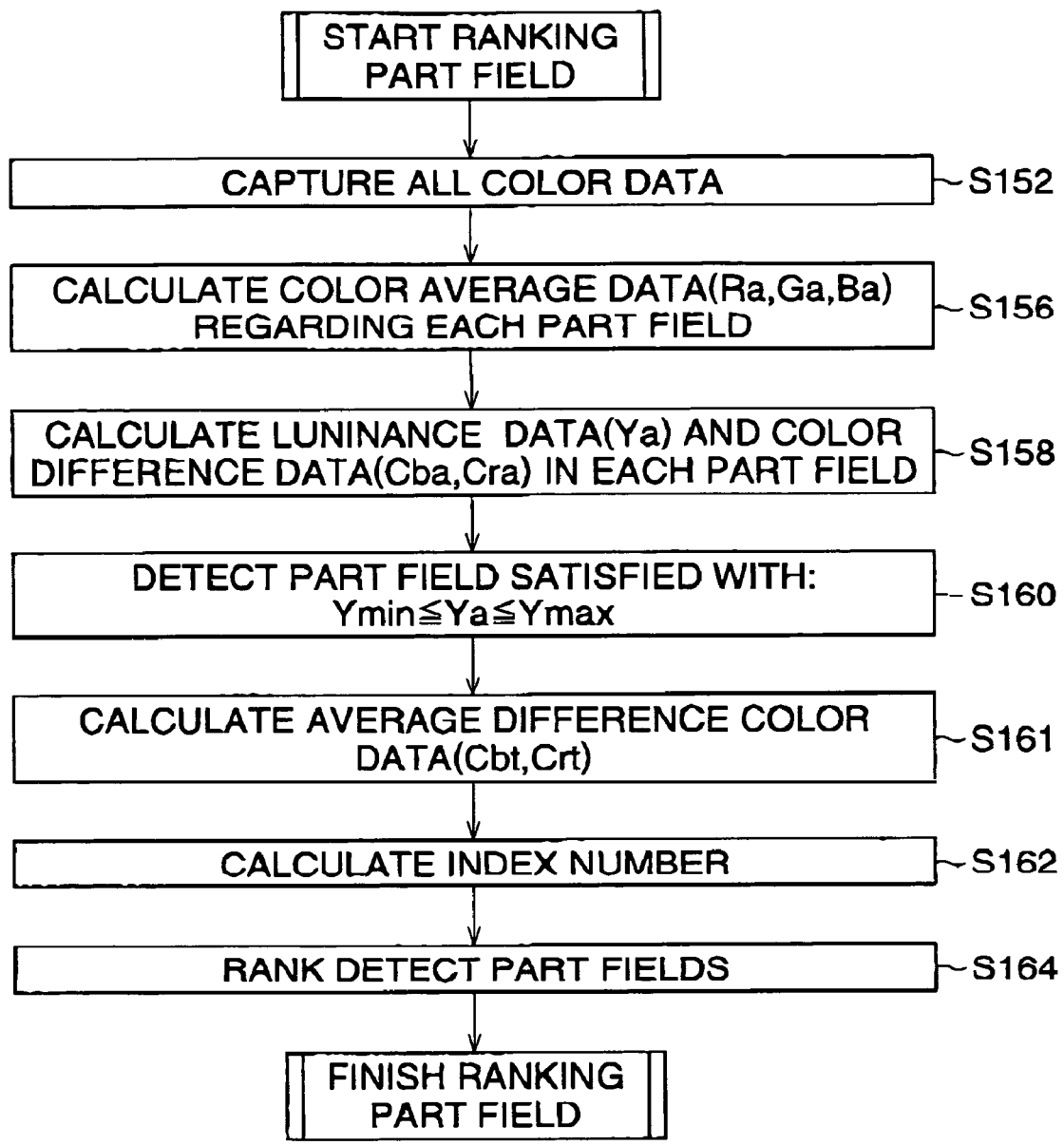
FIG. 6 is a flow chart showing a routine in detail for ranking each part field.

FIGS. 4-6 are the flow charts showing a routine for obtaining the white balance information. In this routine, it is determined whether the power switch 25 is pushed at step S100 at first. If the power switch 25 is pushed, the digital camera 10 is set to the photograph mode and the through image is displayed on the monitor 14 at step S102. In the photograph mode, the still image is obtained at step S106 if it is determined that the release button is fully-pushed at step S104.

In the photograph mode, if the menu switch 19 is pushed, the digital camera 10 enters the condition set-up mode (not shown in the flow chart). In the condition set-up mode, the conditions of the digital camera 10 are changed according to the operation of the switches. At step S110, it is determined whether the white balance mode for setting-up the conditions is for the white balance adjustment has been selected in the condition set-up mode. If the white balance mode has been selected, it is determined whether the white balance mode should be set to the manual white balance mode or the auto white balance mode in step S112. If the mode is set to the auto white balance mode, the digital camera 10 enters the auto white balance mode at step S114. After step S114, the digital camera 10 enters the photograph mode and then the routine goes back and the through image or the still image is photographed at step S102 or at S110 with the auto white balance adjustment. On the other hand, if the mode is set to the manual white balance mode, the digital camera starts the process of obtaining the white balance information manually at step S116. After the white balance information is obtained at step S116, the routine goes back to the step S102 and the camera enters the photograph mode again. In the photograph mode, the image signals undergo the white balance adjustment so as to generate the through image or the still image, based on the white balance information which is obtained at step S116.

FIG. 5 shows the routine in detail for obtaining the white balance information manually at step S116. If the process for obtaining the white balance information manually starts, at first the through image is displayed on the monitor 14 as display image 71, as shown in FIG. 3, at step S131. At step S132, the grid line image 70 is displayed on the display image 71 and the display image 71 is divided into a plurality of part fields by the grid line. In this case, the number of part fields which is set-up in the condition set-up mode in advance is 256, therefore the display image 71 is divided into 256 part fields. Of course, the number of part fields is changeable according to an operation of a switch in the condition set-up mode in advance. Further, several kinds of grid line images are stored in the OSD image memory 45. One of the grid line images, which is read from the OSD image memory 45 based on the required number of part fields, is displayed on the display image 71.

At step S134, it is determined whether the selected part field 74 is selected automatically according to the setting which is set-up in the condition set-up mode. If it is determined that selected part field 74 is selected automatically, at first the divided part fields are ranked at step S150, as described in FIG. 6. After that, the part field which is ranked the highest (first ranking) is selected as the selected part field 72 at step S166. The selected part field 72 is surrounded by the selected frame image 74 so as to distinguish the selected part field 72 from the other part fields at step 200. After that, the routine goes to step S210.

On the other hand, if it is determined that the selected part field 74 is not selected automatically, the center part field 78 (as shown in FIG. 3) is selected as the selected part at step S136. The selected part field 72 is surrounded by the selected frame image 74 at step S140 and then the routine goes to step S210.

At step S210, it is determined whether the four-way controller switch 15 is pushed. If it is not pushed, the routine goes to step S220. If it is pushed, the selected part field 72 is changed according to the input of the switch 15 at step S212. Namely, if the left, right, up, or down key of the switch 15 is pushed, the selected part field 72 is changed to the respective left, right, upper and lower part field from the currently selected part field. At step S214, the selected frame 74 is moved according to the change of the selected part field, and then routine goes to the step S220.

Namely, when the part field (12, 12) is determined to be the selected field 72 as shown in FIG. 3, and if the user thinks that another field (for example field (12, 14)) is appropriate for obtaining the white balance information and pushes the down key of the four-way controller switch 15 twice, the selected field 72 can be changed to the part field (12, 14) according to the operation of the switch. In this case, the selected frame 74 surrounds the part field (12, 14) which is selected.

At step S220, it is determined whether the WB switch 20 is pushed. It the WB switch 20 is pushed, the white balance information is obtained using the color data of the part field is which is selected as the selected part field 72 at step S230. Namely, at first the average of the color data (R, G, B) of pixels in the selected part field 72 is calculated as the average color data (Ra, Ga, Ba). Next, the white balance information is generated based on the average color data (Ra, Ga, Ba) as described above. Namely, for example, the white balance information consists of R gain data ($R_{gain}$), G gain data ($G_{gain}$), and B gain data ($B_{gain}$) which are set to Ga/Ra, 1, and Ga/Ba respectively. After step S230, the routine goes back to step S102. At step S102, the through image is displayed on the monitor 14. In this case, the through image is composed of image data which is converted from image signals which undergo the white balance adjustment using white balance information which is obtained at S230. Namely, RGB gains of the image signals are changed to Ga/Ra, 1, and Ga/Ba respectively so as to adjust the white balance of the image signals. Of course, at step S106 the still image data is converted from the image signals which undergo the white balance adjustment using the white balance information obtained at step S230.

On the other hand, if the WB switch 20 is not pushed, it is determined whether an interrupt operation is carried out at step S222. If the interrupt operation is carried out, the routine goes back to step S102 without obtaining the new white balance information. Therefore, the white balance adjustment is carried out using the previous white balance information in the photograph mode at step S102 or step S106 in the manual white balance mode. Further, an interrupt operation means an operation of a switch with the exception of the 4-way controller switch and the WB switch.

FIG. 6 is a flow chart showing the routine for ranking each part field at step S150. In this routine, firstly the color data regarding all pixels of the display image 71 is captured, at step S152. Next, at step S156, the average of the color data (R, G, B) is calculated as the average color data (Ra, Ga, Ba) regarding the pixels in each of the part fields 75 which were divided at step S132. At step S158, the average of the luminance data (Ya) and the average of the color difference data (Cb, and Cr) is calculated from the average color data (Ra, Ga, Ba) for each part field according to the formulae (2), (3), and (4).

$$Ya = 0.299 \times Ra + 0.587 \times Ga + 0.114 \times Ba \qquad (2)$$

$$Cbr = -0.1684 \times Ra + 0.3316 \times Ga + 0.500 \times Ba \qquad (3)$$

$$Cra = 0.500 \times Ra - 0.4187 \times Ga - 0.0813 \times Ba \qquad (4)$$

At step S160, it is determined whether the luminance data (Ya) in each part field 75 satisfy the formula (5). The part fields, whose luminance data (Ya) satisfy the formula (5), are determined as detected part fields. The detected part fields are ranked at step S164, but part fields which are not detected are not ranked at step S164 as described below. Further, if the luminance data (Ya) in 8 bit (namely, the luminance data (Ya) is indicated from 0 to 255), Ymin is set to 50, and Ymax is set to 200 in formula (5) for example.

$$Y\min \leq Ya \leq Y\max \qquad (5)$$

At step S161, the average of the color difference data in all the detected part fields is calculated as the average color difference data (Cbt, Crt). As described above, if the average color difference data (Cbt, Crt) are calculated, the standard RGB ratio is determined based on "Cbt" and "Crt". Therefore, the standard RGB ratio is determined at step S161.

At step S162, the index number (Cwa) for a the detected part field is calculated according to the formula (1) as described above. At step S164, the detected part field is ranked according to the index number (Cwa) If the index number (Cwa) is closer to 0, the Ra:Ga:Ba ratio is closer to the standard RGB ratio as described above. Therefore, in this ranking system, the detected part field whose index number (Cwa) is smaller, is higher ranking. Furthermore, if two or more than two index numbers (Cwa) have the same value, the part field which is closer to the center part field is ranked higher according to the order of priority as shown in FIG. 7. If the ranking is finished at step S164, the routine for ranking each part field is finished and then the process goes to the step S166 in FIG. 5.

Figure 8:
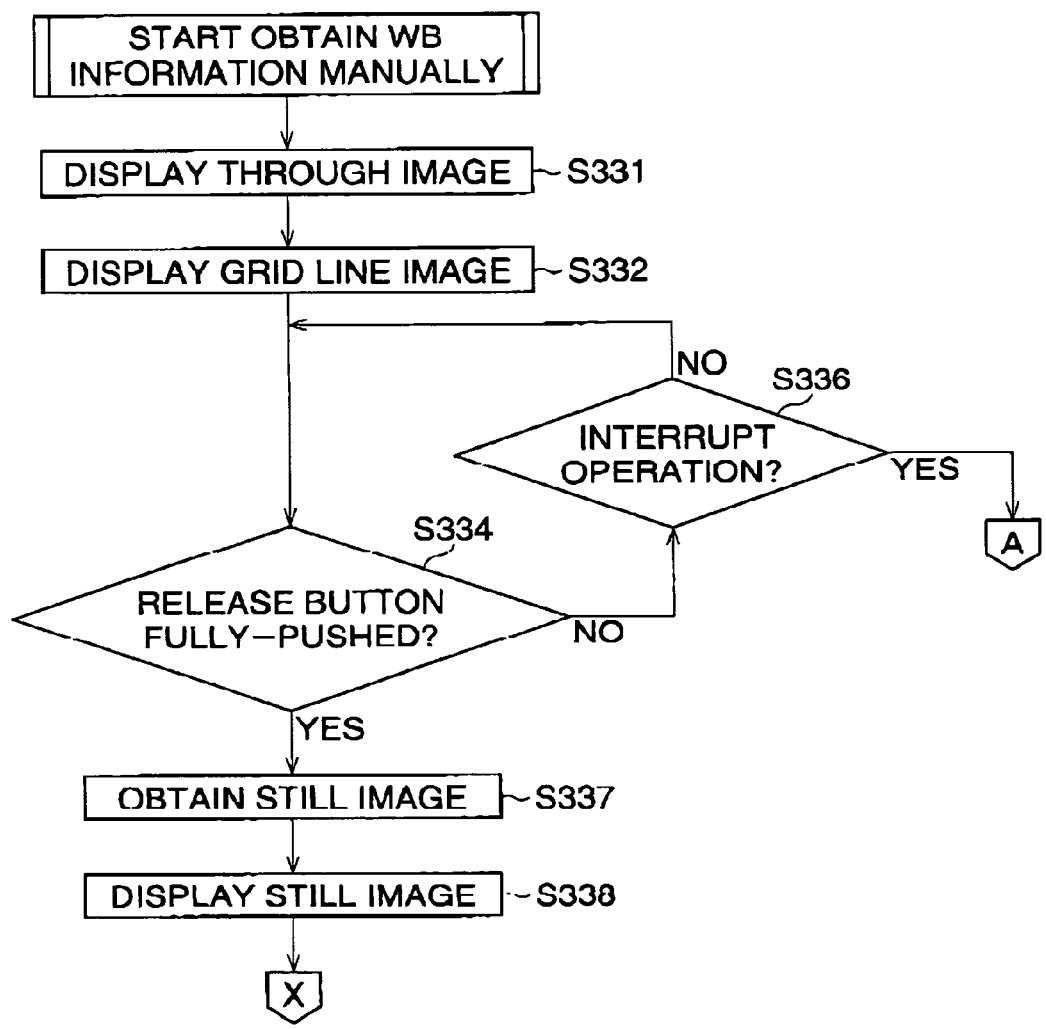
FIG. 8 is a flow chart showing a first half of a routine for manually obtaining white balance information using a still image.
Figure 9:
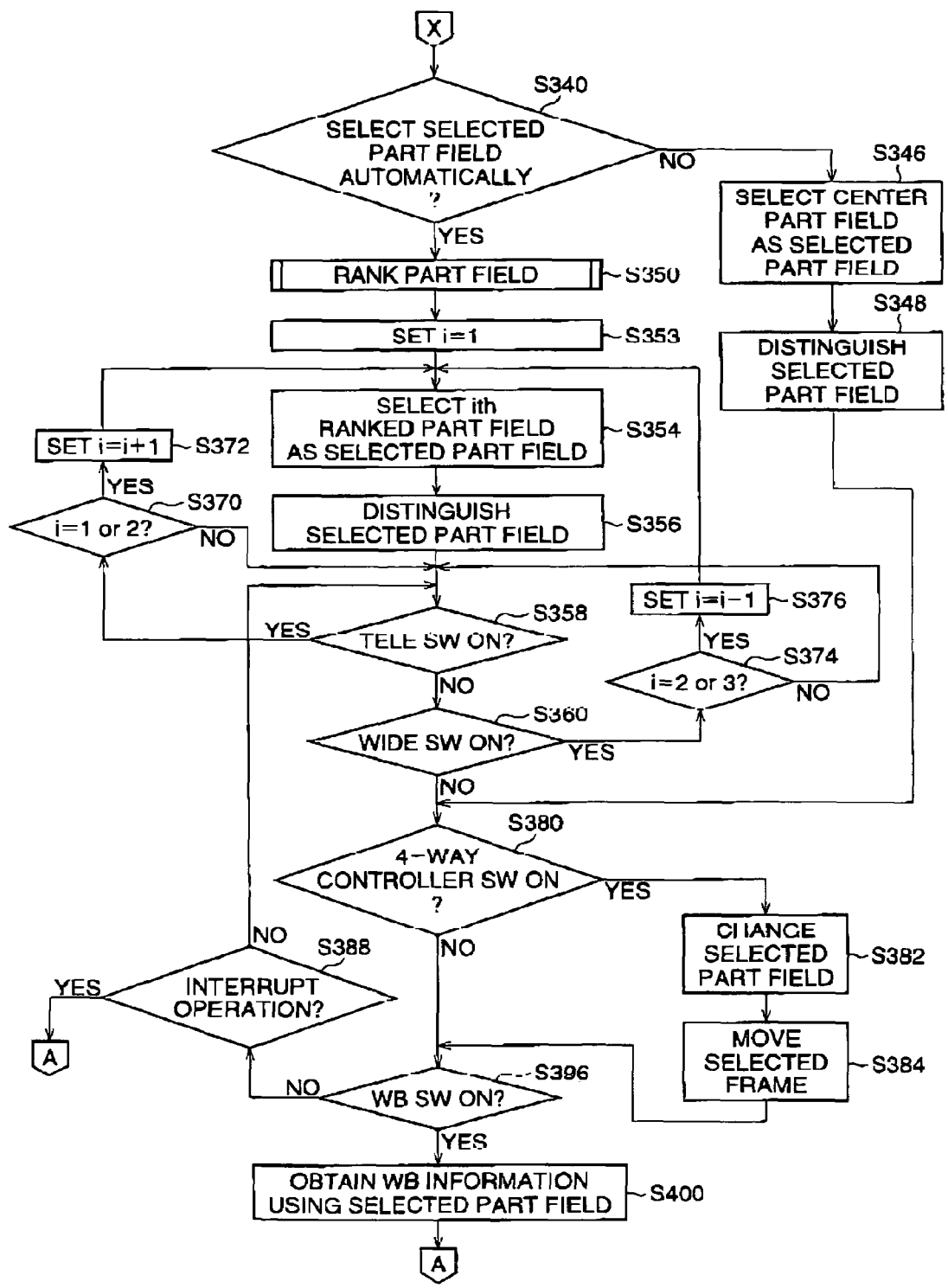
FIG. 9 is a flow chart showing a second half of a routine for manually obtaining white balance information using a still image.

As described above, the routine for obtaining white balance information has been explained for the case where the display image 71 is a through image. However, the display image 71 can be a still image when the white balance information is obtained as described below (as shown in FIGS. 4, 8, and 9). Further, it is determined whether the display image 71 is a through image or a still image by the switch settings in the condition set-up mode, for example.

If the routine goes to step S116 (referring to FIG. 4) the process for manually obtaining white balance information as shown in FIG. 8 is started. In this process, the through image is displayed on the monitor 14 in step S331 Next the grid line image 70 is displayed on the through image at step S332.

At step S334, it in determined whether the release button 24 is fully-pushed. If it is not fully-pushed, the routine goes to step S336 in which it is determined whether the interrupt operation is being carried out. If the interrupt operation is being carried nut, the routine goes back to step S102. If the interrupt operation is not being carried out, the routine goes to step S334. The interrupt operation means a switch operation with the exception of the release switch 51 and the photometry switch 50 (namely release button) in this case.

If the release button is fully-pushed, the still image is obtained as described above at step S337. And the still image is displayed on the monitor 14 as the display image 71 at step S338. Of course, the grid line image 70 is still is displayed on the display image 71 at step S338.

Next, as shown in FIG. 9, at step S340, it is determined whether the selected part field 74 is selected automatically, similar to step S134. If the selected part field 74 is selected automatically, each part field is ranked as described above in FIG. 6 at step S350. After ranking, "i" is set to "1" at step S353, and the part field which is ranked at the $1_{th}$ ranking is selected as the selected part field at step S354. The selected part field 72 is surrounded by the selected frame image 74 so as to distinguish the selected part field 72 from the other part fields at step S356. At step S358, it is determined whether the tele switch 22a is pushed. If the tele switch 22a is pushed the routine goes to stop S370. If it is not pushed the routine goes to step S360. At step S370, it is determined whether the "i" is "1" or "2", if the "i" is "1" or "2" the routine goes to step S372. If the "i" is not "1" or "2" the routine goes back to atop S358. At step S372, "1" is added to "i" and then the routine goes to step S354.

At step S360, it is determined whether the wide switch 22b is pushed if it is pushed, the routine goes to stop S374. If it is not pushed the routine goes to step S380. At step S374, it is determined whether "i" is "2" or "3". If "i" is "2" or "3" the routine goes to step S376. If "i" is not "2" or "3" the routine goes back to step S358. At step S376, "1" is subtracted from "i" and then the routine goes to step S354.

Namely, the part field 75 which is ranked first (highest ranking) is selected as the selected part field 72 at step S353, and then the selected part field is distinguished from the other part fields using the selected frame 74 at S3S4, in the initial situation. And if the zoom switch 22 is pushed, the selected part field is changed. Namely, when the $i_{th}$ ranked part field is selected as the selected field 72, the selected field 72 is changed to the $(i+1)_{th}$ ranked part field, if the tele switch 22a is pushed once. On the other hand, the selected field 72 is changed to the $(i-1)_{th}$ ranked part field, if the wide switch 22b is pushed once.

However, unless "i" is "1" or "2", the value of "i" is not increased by pushing the tele switch 22a. Therefore, if the tele switch 22a is pushed, the selected part field is not changed, when the part field which is not ranked first or second is selected as the selected part field (for example the selected part field 72 is not changed, if the part field which is ranked third is selected as the selected field 72 at step S354, or if the selected field is determined to be the part field which is not ranked second or third at step S380 and S392 when operating the four-way controller switch 15). Similarly, unless "i" is "2" or "3", the selected part field is not changed by pushing the wide switch 22a. Namely, the selected part field is changed among the part fields which are ranked first, second, and third by an operation of the zoom switch 22.

The routine which is carried out below step S380 is similar to the routine below step S210, and the routine which is carried at step S346 and S348 is similar to step S136 and S140, therefore the explanation of these steps is omitted.

In this embodiment, the standard color data is obtained by calculating the color data in the detected part fields as described above. However, the standard color data can be set-up in advance. In this case, the standard RGB ratio regarding the standard color is determined to be 1:1:1 for example, and the detected part field having a Ra, Ga, and Ba ratio which is closer to the standard RGB ratio, is ranked higher, as described above. Further, the RGB ratio of the achromatic color is 1:1:1 and the color data of the part field in which the object having the achromatic color (for example white paper) is displayed, has 1:1:1 RGB ratio. Therefore, the color balance of the part field 75 which is selected as the selected part field 72 in the initial situation is closest to the achromatic color in this case.

As described above, the display image is divided into a plurality of the part fields, and the user selects one part field from the plurality of the part fields in this embodiment. And then, the white balance information is obtained based on color data of the selected one part field. Therefore, the white balance information is obtainable using part of the object image displayed an the monitor 14, which is recognized to be the appropriate part for obtaining the white balance information, without a complicated operation, Namely, a specific operation (for example white paper is photographed) is not carried out for obtaining the white balance information in this embodiment.

Conventionally, it is difficult to obtain the white balance information because it is difficult to photograph an image having achromatic color over the entire display field on the monitor 14. Specially, it is too difficult when a picture is taken by using the digital camera 10 which is held on a tripod. However, in this embodiment, the white balance information is obtainable by using part of the color data of an image, and the image having achromatic color does not have to be photographed over the entire display field of the monitor 14. Therefore, it is easy to obtain the white balance information in any situation.

Furthermore, in this embodiment, the appropriate part field for obtaining white balance information in the display image can be detected automatically. Therefore, the user can select the part field for obtaining white balance information by using the automatically selected part field.

Further, the selected part field is selected from a plurality of detected part fields, whose luminance data (Ya) is in a predetermined range, and this prevents the selection of a part field having color data which has a large value owing to halation, for example. Further, if the color data has a small value the color data is deeply affected by noise, therefore the part fields having small value color data are not detected as detected part fields.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2004-297906 (filed on Oct. 12, 2004) which is expressly incorporated herein, by reference, in its entirety.

The invention claimed is:

1. A digital camera for photographing an object so as to obtain an object image, comprising:
   a display processor that displays said object image as a display image on a monitor, said display image being divided into a plurality of part fields and one of said part fields being selected as a selected part field;
   a distinction processor that distinguishes said selected part field from other part fields in said display image; and
   an obtaining processor that obtains white balance information for carrying out a white balance adjustment, based on color data of pixels in said selected part field,
   wherein said part field which comprises pixels having color data that are closest to standard color data, is selected as said selected part field, said part fields which have a luminance value in a predetermined range are detected as detected part fields, and an average of color data of pixels in said detected part fields is determined to be said standard color data.

2. A digital camera according to claim 1, wherein said display processor indicates said display image as a plurality of part fields.

3. A digital camera according to claim 1, wherein said selected field is changed according to an operation of a switch.

4. A digital camera according to claim 1, wherein said selected part field is selected from said part fields which have a luminance value in a predetermined range.

5. A digital camera according to claim 1, wherein said standard color data has a 1:1:1 RGB ratio.

6. A digital camera according to claim 1, wherein said standard color data is determined to be standard color data in an auto white balance adjustment.

7. A digital camera according to claim 1, wherein said part field which is composed of pixels having an RGB ratio of said color data that is closest to a standard color ratio, is selected as said selected part field.

8. A digital camera according to claim 1, wherein said display image is divided into a number of said part fields which is set-up in advance.

9. A digital camera according to claim 8, wherein the number of said part fields which is set-up in advance is changed according to an operation of a switch.

10. A digital camera according to claim 1, wherein said display image is divided into said plurality of part fields, and each said part field has a same area.

11. A digital camera according to claim 1, wherein said color data is an average of color data of pixels in said selected field.

12. A digital camera for photographing an object so as to obtain an object image, comprising:
    a display processor that displays said object image as a display image on a monitor, said display image being divided into a plurality of part fields and one of said part fields being selected as a selected part field;
    a distinction processor that distinguishes said selected part field from other part fields in said display image; and
    an obtaining processor that obtains white balance information for carrying out a white balance adjustment, based on color data of pixels in said selected part field,
    wherein a plurality of part fields are ranked and said selected part field is changed according to a ranking and an operation of a switch.

13. A digital camera according to claim 12, wherein said part field, which is composed of pixels having color data being closer to standard color data, is ranked higher.

14. A digital camera according to claim 13, wherein said standard color data has a 1:1:1 RGB ratio.

15. A digital camera according to claim 13, wherein said part fields which have a luminance value in a predetermined range are detected as detected part fields, and an average of color data of pixels in said detected part fields is determined to be said standard color data.

16. A digital camera according to claim 13, wherein said standard color data is determined to be standard color data in an auto white balance adjustment.

17. A digital camera according to claim 12, wherein said selected part field is selected from said part fields which have a luminance value in a predetermined range.

18. A digital camera according to claim 12, wherein said part field which is composed of pixels having an RGB ratio of said color data that is closest to a standard color ratio, is selected as said selected part field.

19. A digital camera according to claim 12, wherein said display image is divided into a number of said part fields which is set-up in advance.

20. A digital camera according to claim 19, wherein the number of said part fields which is set-up in advance is changed according to an operation of a switch.

* * * * *